Figure 1:
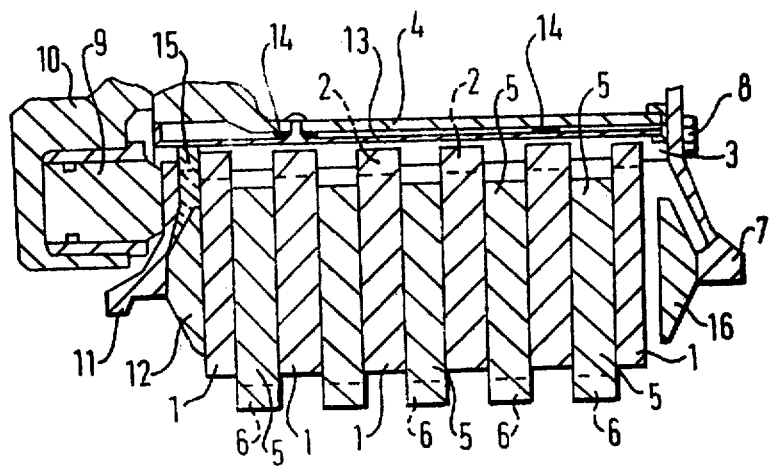

United States Patent
Malone

[11] 3,887,041
[45] June 3, 1975

[54] DISC BRAKES

[75] Inventor: Denis Frederick Malone, Coventry, England

[73] Assignee: Dunlop Limited, London, England

[22] Filed: Dec. 18, 1973

[21] Appl. No.: 425,844

[30] Foreign Application Priority Data
Dec. 19, 1972 United Kingdom............. 58655/72

[52] U.S. Cl.......... 188/71.5; 188/71.1; 188/264 G; 192/70.11
[51] Int. Cl............................................. F16d 55/36
[58] Field of Search............. 188/71.1, 71.5, 264 G, 188/218 A, 216, 251 A; 192/112, 70.11, 70.28

[56] References Cited
UNITED STATES PATENTS
2,423,881 7/1947 DuBois ............................. 188/71.5
2,683,504 7/1954 Martin .............................. 188/71.5
3,754,624 8/1973 Eldred ....................... 188/264 G X FOREIGN PATENTS OR APPLICATIONS
878,973 10/1961 United Kingdom............ 188/264 G Primary Examiner—George E. A. Halvosa
Attorney, Agent, or Firm—Stevens, Davis, Miller & Mosher

[57] ABSTRACT

In a disc brake of the kind comprising a pack of interleaved rotor and stator discs more especially of oxidizable material such as carbon, and wherein the stator discs are keyed to a torque tube, heat shields are provided between the keys of the torque tube and spaced therefrom and the stators are suitably formed between their keyways to clear the heat shields. An annular air excluder member is provided which extends between the thrust-applying ring at one end of the disc pack and the torque tube to prevent air flow between the inner peripheries of the discs and the torque tube.

4 Claims, 5 Drawing Figures

DISC BRAKES

This invention relates to multi-plate disc brakes comprising a number of annular non-rotatable or stator discs interleaved with a number of annular rotatable or rotor discs and a brake-applying mechanism arranged to axially displace the rotor and stator discs into frictional engagement.

When such disc brakes are employed to brake an aircraft wheel, the stator discs are conventionally keyed at their inner peripheries to a non-rotatable torque tube and the rotor discs are keyed at their outer peripheries to the associated aircraft wheel.

With the ever-increasing performance and carrying capacity of modern aircraft the demands imposed on aircraft wheel brakes are also continually increasing. In an attempt to meet this increased braking performance demand, brake designers have found it necessary to turn to new friction materials which are capable of maintaining the required value of friction coefficient at the higher operating temperatures, of the order of 1000°C., now encountered in aircraft disc brakes.

One material currently in favor with aircraft disc brake designers, on account of its good frictional properties and high specific heat, is carbon, which, if the operating conditions demand, may be reinforced with filamentary carbon in the form of carbonized cloth or tape or the like or any other suitable reinforcement.

One of the problems associated with the use of carbon is that at the high operating temperatures now encountered in aircraft disc brakes any area of the carbon friction material which is exposed to the atmosphere tends to oxidize.

By virtue of the interleaved construction of a multi-plate disc brake it is the inner and outer peripheries of the brake discs which suffer the greatest exposure to the atmosphere. Thus any oxidation which occurs tends to take place in these exposed peripheral regions of the disc which also include the torque-transmitting keys or keyways.

It is thus desirable to eliminate or reduce to an acceptable level the oxidation of these peripheral torque-transmitting regions in order for the discs to have an acceptable operating life.

It is an object of the present invention to provide a multi-plate disc brake which alleviates the above problems of oxidation.

According to the present invention a multi-plate wheel disc brake comprises a number of annular stator discs axially slidably coupled with a non-rotatable torque-taking structure at their inner peripheries and interleaved with a number of annular rotor discs axially slidably coupled at their outer peripheries with the wheel, a brake-applying mechanism arranged to axially displace the discs into frictional engagement, and an annular air excluding member which in combination with the torque-taking structure and the remainder of the brake structure substantially eliminates the axial flow of air through the brake adjacent the inner periphery of the stators.

Several embodiments of the present invention will now be described by way of example with reference to the accompanying drawings in which FIG. 1 is a half radial section of a multi disc brake for an aircraft, and FIGS. 2, 3, 4 and 5 respectively illustrate modifications of the brake of FIG. 1.

FIG. 1 of the accompanying drawings shows a half radial section through a typical aircraft multi-plate wheel disc brake. The brake basically comprises a number of annular carbon stator discs 1 each reinforced with laminations of carbonized cloth and provided on its inner periphery with a number of circumferentially spaced keyways 2 which slidably engage corresponding circumferentially spaced metal keys 3 formed on a non-rotatable torque tube 4. Interleaved between the stator discs are a number of annular carbon rotor discs 5 each again reinforced with laminations of carbonized cloth and provided on its outer periphery with a number of circumferentially spaced keyways 6 which slidably engage corresponding circumferentially spaced metal keys (not shown) provided on the associated wheel. A reaction flange 7, which supports a reaction ring 16, is secured to the axially outer end of torque tube 4 by bolts 8. A number of circumferentially spaced hydraulic brake-applying piston and cylinder assemblies 9 are provided in a hub assembly 10 which supports torque tube 4. The axial brake-applying thrust from the piston and cylinder assemblies is transmitted to the adjacent stator discs, and hence to the remaining rotors and stators, via thrust transmitting rings 11 and 12 which equalize the thrust in the circumferential direction in the manner described in the assignee's U.S. Pat. No. 3,653,472.

When the piston and cylinder assemblies 9 are actuated the rotor and stator discs are axially displaced on their mounting keys until the axially outer stator contacts reaction ring 16 at which point all the discs come into full frictional engagement.

Experience has shown that during the operation of the brake the inner peripheral regions of the stators tend to become the hottest part of the brake. This is due to an imbalance in the rate of heat dissipation from the rotors and stators, the rotors dissipating heat at a faster rate than the stators due to the greater peripheral area of the rotors exposed to the cooling effects of the atmosphere.

This imbalance in the rate of heat dissipation also results in the inner peripheries of the stators remaining at a higher temperature, and hence in a condition susceptible to oxidation, for a longer period after the operation of the brake than the remainder of the brake.

In order to reduce the heat transfer from the stators to the torque tube and hence to the rest of the brake, the inner peripheries of the stators between the keyways are spaced from the torque tube and sheet metal heat shields 13 are provided on the torque tube between the keys. The heat shields are spaced from the torque tube by mounts 14 of heat insulating material. Additional heat insulating material (not shown) can be provided between the heat shields and the torque tube if required.

The clearance between the keys and keyways must also be sufficient to accommodate the different rates of thermal expansion of the disc and key material.

During, and for some time following the operation of a disc brake of the kind described above, the high temperatures encountered at the inner peripheries of the stator discs, combined with the axial flow of air through the brake between the stators and the torque tube and keys, tend to make the inner peripheries of the stators particularly susceptible to oxidation, as described above, with the consequent weakening and eventual failure of the stators in the vicinity of the torque-transmitting keyways.

Figure 2:
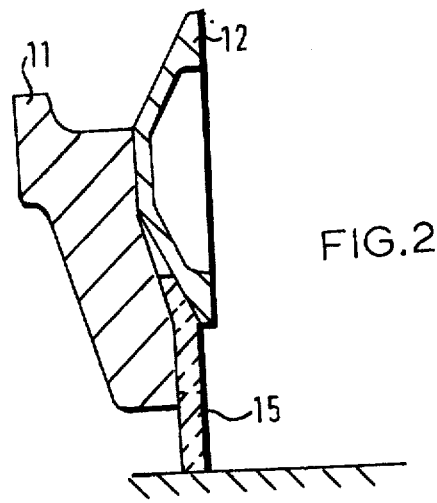

In order to alleviate this problem of oxidation it is proposed to provide the brake, as shown in FIG. 2, with an annular air excluding member 15 wedged between thrust-transmitting rings 11 and 12. The inner periphery of the air excluding member is shaped so as to be a close-running fit with the keys and the torque tube and thus virtually completely eliminates the axial flow of air through the brake.

The air excluding member may be made from any material with suitable temperature characteristics such as asbestos or glass-fiber based heat insulating material.

When employing an air excluding member formed from a deformable material, such as asbestos, the cut-outs provided in the inner periphery to co-operate with the keys on the torque tube may be initially formed undersize so that when the air excluding member is mounted on the keys the regions of the air excluding member surrounding the cut-outs are deformed and the desired close-sliding fit obtained.

In the kind of brake construction shown in FIG. 1 the reaction flange 7 and associated reaction ring 16 together prevent the entry of air from the axially outer end of the brake in between the stator discs and the torque tube and keys once the brake discs are in frictional engagement. Thus an air excluding member is only required at the axially inner end of the brake. If the brake construction demands, air excluding members may be fitted at both ends of the brake.

Figure 3:
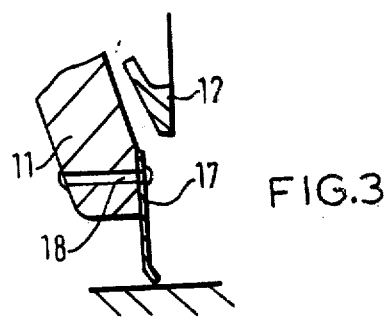
Figure 4:
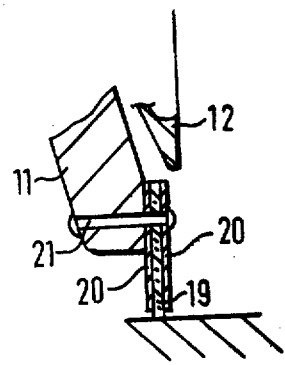
Figure 5:
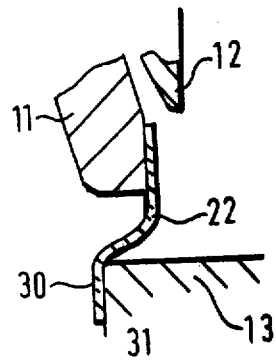

FIGS. 3, 4 and 5 show further forms of air excluding members which are secured to thrust transmitting ring 11.

In the arrangement shown in FIG. 3 the air excluding member comprises an annular steel sheet 17 which is secured to the thrust ring 11 by rivets 18, the inner periphery of the annulus being flared towards the rotors and stators and arranged to be a close-running fit with the keys and torque tube so as to exclude air from the interior of the brake.

FIG. 4 shows an arrangement in which the air excluding member comprises an annulus of heat insulating material 19, which again makes a close-sliding fit with the keys and torque tube, and is supported on either side by two sheet metal annular bands 20 which are spaced at their inner peripheries from the torque tube and keys and are secured to the thrust ring 11 by rivets 21.

The arrangement shown in FIG. 5 shows an annular air excluding member 22 of insulating fabric which is bonded to thrust ring 11. The inner periphery of the air excluding member is bonded to or otherwise secured to the torque tube or its associated supporting structure at a position axially inward of the keys, and is arranged to flex during the application of the brake. The radially outer periphery 30 of the member 22 overlaps the adjacent axial end 31 of each heat shield 13 in all positions of the ring 11 relative to the torque tube and due to the resilience of the member 22 it remains in sealing contact with the surface 31 as the ring 11 moves to the left, as viewed, to release the brake.

Having now described my invention, what I claim is:

1. A multi-plate wheel disc brake comprising a number of annular stator discs axially slidably coupled with a non-rotatable torque-taking structure at their inner peripheries and interleaved with a number of annular rotor discs axially slidably coupled at their outer peripheries with the wheel, a brake-applying mechanism arranged to axially displace the discs into frictional engagement, the torque-taking structure comprising a torque tube having a plurality of longitudinally extending, circumferentially spaced keys and heat shield means between each adjacent pair of keys mounted in spaced relation to the torque tube, the inner peripheries of the stators being formed with circumferentially spaced keyways which respectively engage the keys of the torque tube, and the inner diameter of each stator between adajcent pairs of keyways being great enough to clear the heat shield means, said heat shield means between each adjacent pair of keys of the torque tube comprising an elongated strip of sheet metal which is secured to the torque-tube by heat-insulated mounting means adapted to maintain the heat shield in spaced relation to the torque tube and an annular air excluding member which in combination with the torque-taking structure and the remainder of the brake structure substantially eliminates the axial flow of air through the brake adjacent the inner periphery of the stators.

2. A brake as claimed in claim 1 wherein the brake-applying mechanism includes a thrust ring to the inner peripheral portion of which an outer peripheral portion of the air excluding member is secured, the inner periphery of the air excluding member having keyways which fit the keys of the torque tube and the major diameter of the air excluding member between the keyways thereof being such that the air excluding member makes contact with each heat shield means.

3. A brake as claimed in claim 2 wherein the air excluding member is resiliently flexible and overlaps an axial end of each heat shield means at all positions of the thrust ring relative to the torque tube.

4. A brake as claimed in claim 2 wherein the brake-applying mechanism comprises a thrust transmission means having two concentric annuli of differing diameters interconnected by deformable connecting means and the outer periphery of the air excluding member is located between the two concentric annuli of said thrust transmission means.

* * * * *